(12) United States Patent
Wager

(10) Patent No.: US 12,385,543 B2
(45) Date of Patent: Aug. 12, 2025

(54) COMBINED SHOCK ABSORBER AND GAS SPRING

(71) Applicant: Gebhard Charles Wager, Kelowna (CA)

(72) Inventor: Gebhard Charles Wager, Kelowna (CA)

(*) Notice: Subject to any disclaimer, the term of this patent is extended or adjusted under 35 U.S.C. 154(b) by 394 days.

(21) Appl. No.: 17/761,335

(22) PCT Filed: Sep. 18, 2020

(86) PCT No.: PCT/CA2020/051252
§ 371 (c)(1),
(2) Date: Mar. 17, 2022

(87) PCT Pub. No.: WO2021/051201
PCT Pub. Date: Mar. 25, 2021

(65) Prior Publication Data
US 2022/0325771 A1    Oct. 13, 2022

Related U.S. Application Data

(60) Provisional application No. 62/903,050, filed on Sep. 20, 2019.

(30) Foreign Application Priority Data

Sep. 20, 2019   (CA) .................. CA 3056184

(51) Int. Cl.
*F16F 9/06* (2006.01)
*B60G 15/12* (2006.01)
(Continued)

(52) U.S. Cl.
CPC .............. *F16F 9/062* (2013.01); *B60G 15/12* (2013.01); *F16F 9/368* (2013.01);
(Continued)

(58) Field of Classification Search
CPC ...... F16F 9/062; F16F 9/368; F16F 2222/126; F16F 2228/066; F16F 2232/08;
(Continued)

(56) References Cited

U.S. PATENT DOCUMENTS

| 6,135,434 A * | 10/2000 | Marking ................ F16F 9/062 188/315 |
| 6,311,962 B1 * | 11/2001 | Marking ................ B60G 15/14 267/64.25 |

(Continued)

FOREIGN PATENT DOCUMENTS

WO    2018141049 A1   8/2018

OTHER PUBLICATIONS

Burwell, Daniel, International Search Report for International application No. PCT/CA2020/051252 Dec. 14, 2020, 4 pages, ISA/CA, Gatineau, Quebec, Canada.
(Continued)

*Primary Examiner* — Thomas W Irvin
(74) *Attorney, Agent, or Firm* — Field LLP; Michael Wilton Sharp

(57) ABSTRACT

A combination gas spring and shock absorber apparatus includes a vented gas spring housing and a vented shock absorber housing slidably mounted within the gas spring housing. A shock absorber piston is concentrically mounted within a gas spring piston. A base housing is slidably mounted in the gas spring housing. A shaft extends through the base housing and into the shock absorber housing. The shock absorber piston is mounted in the shock absorber housing on the free end of the shaft. The gas spring piston is mounted in the gas spring housing on the distal end of the base housing. The shock absorber piston is fluidically sealed and slides within the shock absorber housing. The gas spring piston is fluidically sealed and slides along the gas spring
(Continued)

housing and the shock absorber housing. The base housing telescopically translates relative to the gas spring housing.

3 Claims, 5 Drawing Sheets

(51) Int. Cl.
*F16F 9/36* (2006.01)
*B62M 27/02* (2006.01)

(52) U.S. Cl.
CPC .... *B60G 2202/314* (2013.01); *B60G 2204/62* (2013.01); *B60G 2206/41* (2013.01); *B60G 2206/42* (2013.01); *B60G 2500/104* (2013.01); *B60G 2500/2012* (2013.01); *B60G 2800/162* (2013.01); *B62M 2027/026* (2013.01); *F16F 2222/126* (2013.01); *F16F 2228/066* (2013.01); *F16F 2232/08* (2013.01); *F16F 2234/02* (2013.01)

(58) Field of Classification Search
CPC ............... F16F 2234/02; B60G 15/12; B60G 2202/314; B60G 2204/62; B60G 2206/41; B60G 2206/42; B60G 2500/104; B60G 2500/2012; B60G 2800/162; B62M 2027/026
See application file for complete search history.

(56) References Cited

U.S. PATENT DOCUMENTS

| | | | |
|---|---|---|---|
| 6,938,887 B2 | 9/2005 | Achenbach | |
| 8,480,064 B2* | 7/2013 | Talavasek | F16F 9/06 280/283 |
| 8,944,422 B2* | 2/2015 | Achenbach | F16F 9/0209 267/64.25 |
| 9,156,519 B2 | 10/2015 | Ripa | |
| 9,500,254 B2* | 11/2016 | McAndrews | F16F 9/504 |
| 9,518,630 B2* | 12/2016 | McAndrews | B62K 25/28 |
| 9,981,712 B2* | 5/2018 | Barefoot | B62K 25/04 |
| 10,029,758 B2* | 7/2018 | McAndrews | B62K 3/02 |
| 10,156,279 B2* | 12/2018 | Barefoot | B62K 25/04 |
| 10,500,915 B2* | 12/2019 | Barefoot | B60G 15/12 |
| 11,376,913 B2* | 7/2022 | Barefoot | F16F 9/36 |
| 2015/0034436 A1* | 2/2015 | McAndrews | B62K 25/28 188/297 |
| 2017/0050698 A1* | 2/2017 | McAndrews | B62K 25/28 |

OTHER PUBLICATIONS

Burwell, Daniel, Written Opinion for International application No. PCT/CA2020/051252 Dec. 15, 2020, 6 pages, ISA/CA, Gatineau, Quebec, Canada.

* cited by examiner

PRIOR ART    FIG. 1

COMBINED SHOCK ABSORBER AND GAS SPRING

TECHNICAL FIELD

This invention relates to the field of vehicle suspension and control, and in particular to a vehicle component having a combined gas spring and shock absorber.

SUMMARY

In one aspect of the present disclosure, the suspension assembly of each wheel is independently adjustable and consists of an adjustable suspension gas spring having at least two chambers, an inlet/outlet valve is provided for each chamber, whereby the pressure in either or both of the chambers may be individually and independently adjusted by a controlled set of valves. In one embodiment, by way of example, the valves cooperate with an on-board processor. Advantageously, such a dual-chamber adjustable suspension gas spring is controlled by the processor in response to sensor inputs or user-selected pre-set operating modes which, for example in the case of wheeled vehicles, enable both ride height adjustment of each individual wheel, as well as providing for forced (as opposed to passive) extension or retraction of the spring and/or adjusting the stiffness of the adjustable suspension gas spring so as to adjust the spring rate. A shock absorber component is mounted within the gas spring, and cooperates with the gas spring as a component which is integral to the gas spring.

Although the adjustable, dual-chamber suspension gas spring and the shock absorber are generally described herein as using air for the operating gas, it will be appreciated by a person skilled in the art that the present disclosure is not so limited and that other gases or fluids may be utilized as the operating gas or fluid to independently change the pressure in the chambers of the adjustable suspension gas spring or shock absorber. For example, compressed $CO_2$ or other suitable compressed gases, or as another example, hydraulic fluids used in conjunction with air or another compressible gas or compressible fluid to change the pressure of the compressible gas or fluid, may also be employed.

BACKGROUND

An active vehicle suspension is described in published patent application WO2018141049A1 for the invention of Gebhard Wager wherein adjustable air springs are described. FIG. 1 in that published application describes an active suspension system 10 which includes a valve assembly 12, such as a valve block, operatively connected to a fluid source 14 and an electronic controller 16. The valve assembly 12 may comprise a plurality of bidirectional valves, wherein each bidirectional valve is connected to a fluid line leading to either the upper chamber or the lower chamber of an adjustable suspension air spring.

As shown in FIG. 1 in that prior art publication, and reproduced herein as FIG. 1, adjustable suspension gas springs 20 and 22 are operatively coupled to the front left and right wheel assemblies respectively, and adjustable suspension gas springs 30 and 32 are operatively coupled to the rear left and right wheel assemblies respectively of a four-wheeled off-road vehicle 1. The adjustable suspension springs 20, 22, 30, and 32, may each comprise of a cylinder 24, a piston 26 and a piston shaft 27 having coupling 28 for coupling to the respective wheel assembly.

Each adjustable suspension spring is divided into two chambers. For example, the front left adjustable suspension spring 20 is divided into an upper chamber 20a and a lower chamber 20b. The upper and lower chambers 20a, 20b, are separated by the piston 26. Piston shaft 27 extends through the lower chamber 20b and is adjacent wheel assembly coupling 28. Thus, when a wheel assembly coupled to an adjustable suspension spring encounters, for example, a rock, log or other obstacle on the terrain over which the vehicle is travelling, or during travel detects body roll, the approximately vertical force of the force vector experienced by the wheel is transmitted through the coupling 28 and shaft 27 to slide the piston 26, thereby increasing the pressure in the upper chamber (20a, for example) and decreasing the pressure in the lower chamber (20b, for example), presuming that the operating fluids in the upper and lower chambers are compressible.

Referring now to the electronically controlled embodiment, each of the upper and lower chambers of each of the adjustable suspension springs 20, 22, 30, 32 are provided with a position sensor 33 for monitoring the ride height of each individual wheel, specifically monitoring when each individual wheel is adjusted to maximum and minimum ride heights. The position sensors 33 are in electronic communication with electronic controller 16. Control to adjust suspension springs 20, 22, 30, 32 may be electronic or automatic, or may also be manual.

Similarly, adjustable suspension spring 22 is divided into upper and lower chambers 22a, 22b; adjustable suspension spring 30 is divided into upper and lower chambers 30a, 30b; and adjustable suspension spring 32 is divided into upper and lower chambers 32a, 32b. Each of the upper and lower chambers 20a, 20b of the adjustable suspension spring 20 are provided with a port 25 fluidly coupled to a fluid line 23, and each fluid line 23 is attached at the other end to a valve 21 mounted to the valve assembly 12. Similarly, the upper and lower chambers of each of the other adjustable suspension springs 22, 30, 32, each are provided with a port 25 coupled to a fluid line 23, whereby the opposite end of the fluid line 23 is coupled to a valve 21 mounted to the valve assembly 12. Furthermore, each of the upper and lower chambers of each of the adjustable suspension springs 20, 22, 30, 32, are provided with a pressure sensor 29 for monitoring the pressure of each chamber. The pressure sensors 29 are in electronic communication with electronic controller 16.

BRIEF DESCRIPTON OF DRAWINGS

DETAILED DESCRIPTION

In the present invention, each adjustable suspension spring combines a gas spring with an internally mounted shock absorber. Briefly put, a shock absorber is a mechanical or hydraulic device which absorbs and dampens shock impulses, surface road conditions of the terrain on which vehicles with shock absorbers drive. Most shock absorbers are a form of dashpot.

Many pneumatic and hydraulic shock absorbers are conventionally used in conjunction with springs and/or cushions. The springs may be helical coil springs, and the shock absorber, being usually cylindrical, may fit inside the spring. Those forms of shock absorbers are sometimes referred to as "coil-over shocks".

Figure 2:
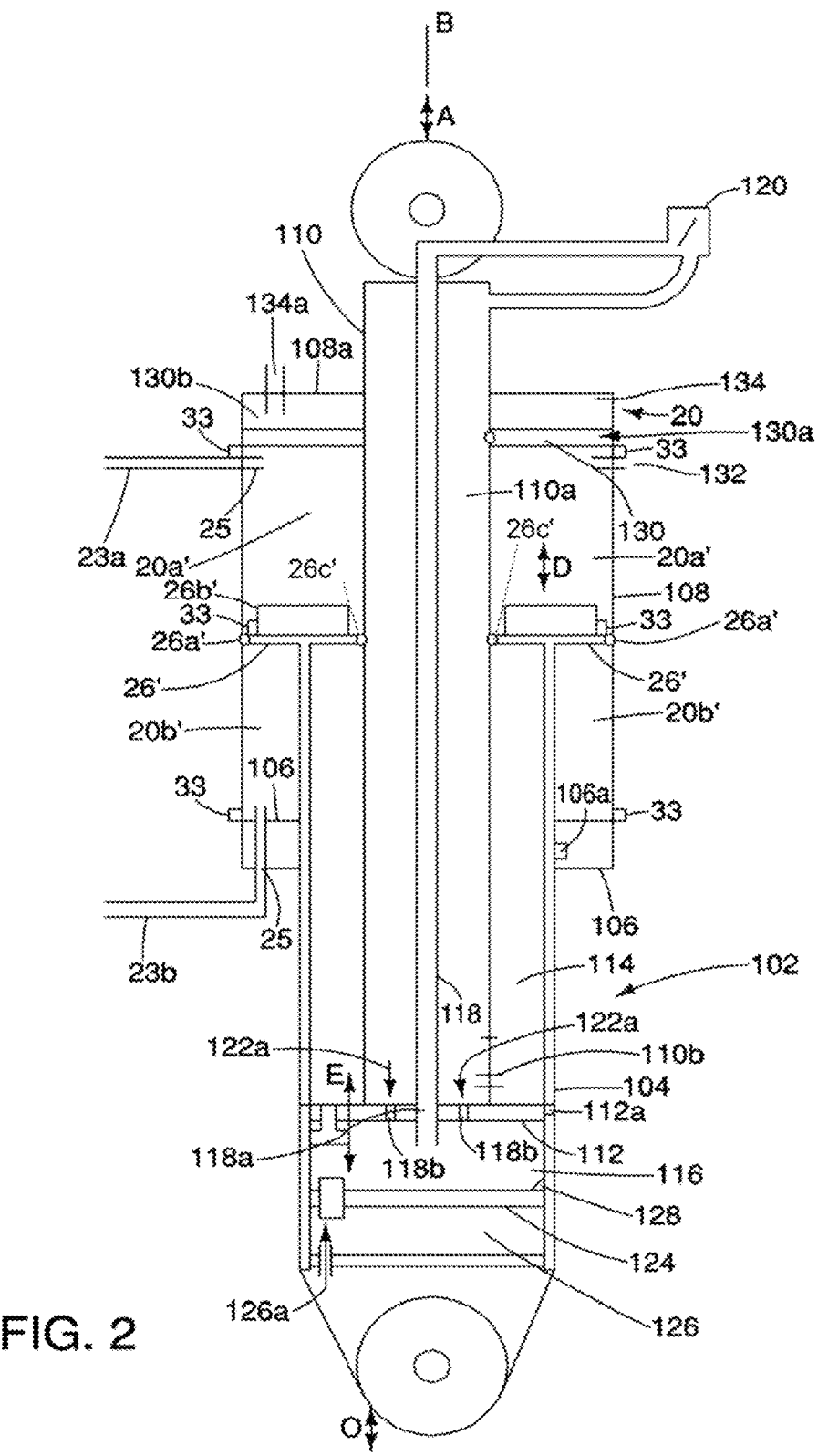
FIG. 2 depicts a cross-sectional view of a combined gas spring/shock absorber in accordance with an embodiment of the present invention.

The combined gas spring/shock absorber 100 in the embodiment of the present invention depicted in FIG. 2 includes a gas spring modified so that a mono-tube shock absorber is slidably mounted internally within the gas spring.

Thus as seen in FIG. 2, shock absorber housing 102 translates in direction A along longitudinal and centroidal axis B relative to gas spring housing 20' upon a force acting in direction C on, for example, a lower end of the shock absorber housing 102.

Figure 1:
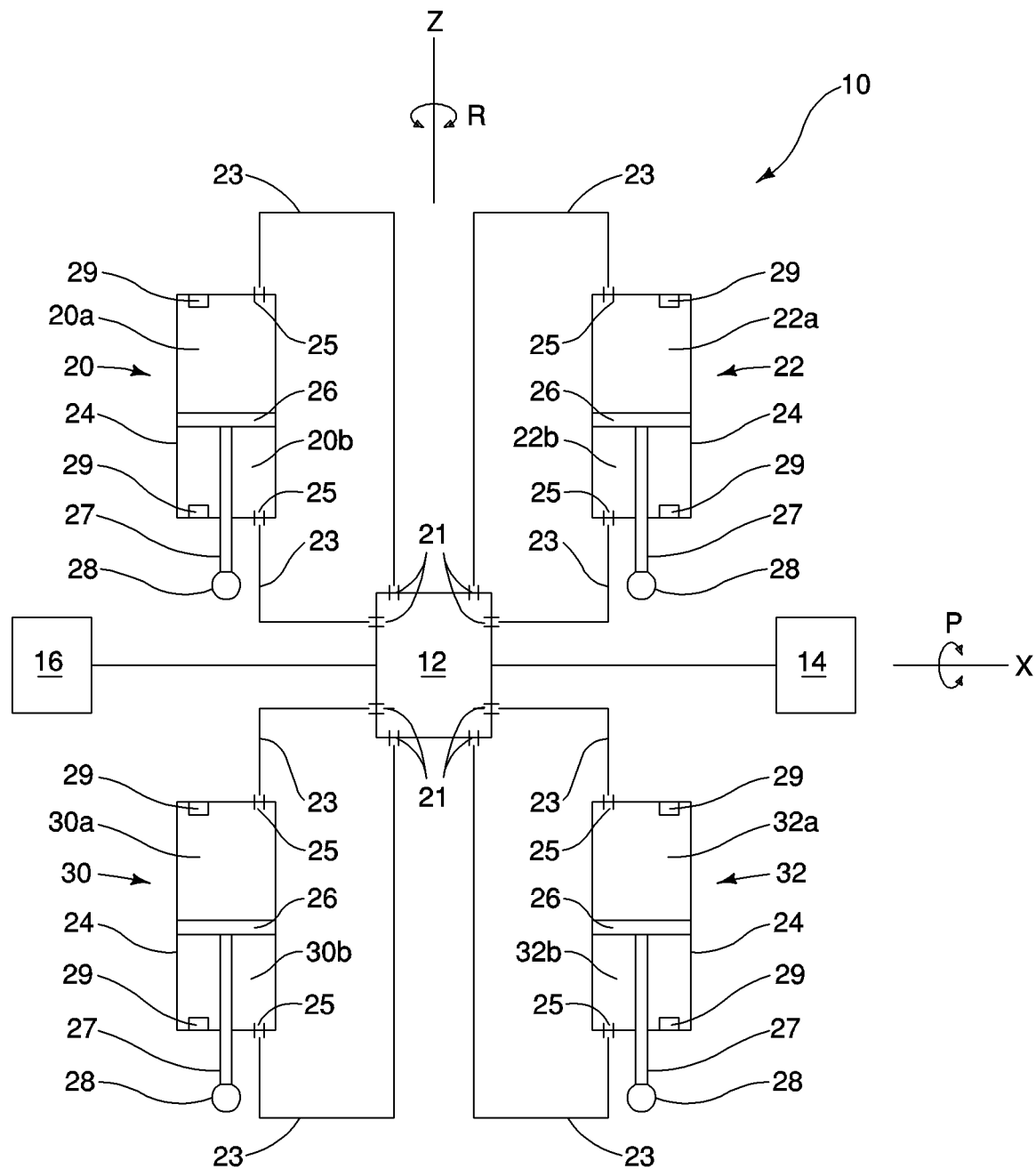
FIG. 1 depicts an active vehicle suspension system in accordance with the prior art.

Within shock absorber housing 102, a base housing 104 is slidably journaled in annular seals 106a in the lower, ring-shaped base 106 of gas spring housing 20'. It will be appreciated that base housing 104 replaces the function of piston shaft 27 in the gas spring embodiment of FIG. 1. Thus the upper end of base housing 104 is mounted to piston 26; being a modified piston 26. As with piston 26, piston 26' floats slidably along the interior of the cylindrical wall 108 of gas spring housing 20'. Piston 26' moves in direction D within cylinder 108.

Shock absorber shaft 110 lies along axis B and moves relative to both gas spring housing 20' and base housing 104. Again, base housing 104 also moves relative to gas spring housing 20'. A sealed lower disc or ring or piston 112 slidably anchors the lower end of shaft 110 within base housing 104. Seals 112a fluidically seal the upper chamber 114 within base housing 104 of shock absorber housing 102 from the lower chamber 116 within base housing 104. Lower piston 112 moves in direction E within base housing 104. In this embodiment chambers 114 and 116 are filled with oil. In other embodiments the chambers may be filled with gas such as air. As will be appreciated by one skilled in the art, reference to upper and lower is to assist in understanding FIG. 2, and not intended to be limiting as references herein to upper/lower or up/down or top/bottom may be reversed or oriented differently, for example horizontally in a side-by-side configuration, in other embodiments.

A bypass line 118 extends through lower piston 112 via aperture 118a and along shaft 110 for the passing of the oil between chambers 114 and 116. Bypass valve 120 cooperates with bypass line 118. The bypass valve 120 is electronically controlled and may be opened to soften the shock absorber housing 102 when the vehicle is travelling for example, on rocky terrain. Oil passing from chamber 116 then line 118 is returned into the hollow chamber 110a within and along shaft 110 to exit into chamber 114 via bypass port 110b. Oil may also flow oppositely to travel from chamber 114 to chamber 116, for example, when upward movement of lower piston 112 compresses the oil in chamber 114. Oil may also follow between chamber 114 and 116 in direction E through threaded apertures 118b in piston 112 in which are seated flow adjustment screws 122a. The oil flow rate through apertures 118b is varied by adjusting screws 122a.

Optionally a floating piston 124, also seen in FIG. 2, slidably mounted and sealed by seals 124a within the lower-most end of base housing 104 partitions chamber 116 from bump stop air chamber 126. Stops 128, mounted or formed on the inside wall of base housing 104, limit the upper travel of floating piston 124. The pressurized gas within air chamber 126 provides the resilient air bump against which floating piston 124 may engage at the lower end of its travel and provides cushioning for jarring harsh bumps. Air to pressure chamber 126 is provided from a pressurized air source (not shown) via port 126a.

Gas spring housing 20' is mounted over the upper end of shock absorber housing 102 so as to rest the upper end of shock absorber housing 102, and in particular piston 26' within cylindrical wall 108, between gas spring air chambers 20a' and 20b'. Piston 26' is sealed against wall 108 by seals 26a' and against chamber 110a by inner seal 26c'. The operating gas (e.g. air) is supplied to, or extracted from, air chambers 20a', 20b', via the air conduits 23a and 23b respectively. Air conduits 23a, 23b lead to a pressurized gas source (not shown). Chambers 20a' and 20b' may thus be selectively and independently pressurized or de-pressurized to create a pressure differential between the chambers 20a', 20b' to urge piston 26' in the desired vertical direction and/or to modify the gas spring rate. The vertical travel of piston 26' along cylinder 108 is bounded at the bottom end by base 106 and at the upper end by either the top of cylinder 108 or, optionally, by a floating piston 130 providing an air bump at the upper end of base housing 104, which slides along and within, in sealed engagement with, the inner surface of the wall of cylinder 108, sealed by seal 130a. Downward travel of piston 130 is limited by stop 132. Piston 130 defines a gas chamber 134 between piston 130 and the closed upper end 108a of cylinder 108. Pressurized gas (e.g. air) is supplied to gas chamber 134 via port 134a from a pressurized gas source (not shown). The pressurized gas within gas chamber 134 provides the resilient air bump against which piston 26' may engage at the upper end of its travel.

Both piston 26' and piston 130 may have an annular perimeter channel 26b' and 130b respectively formed in their upper surfaces to accommodate gas passing into or out of their respective chambers 20a', 134 from their respective gas ports 26, 134a.

Advantageously, the combined gas spring/shock absorber 100 is infinitely adjustable in the field. The gas spring/shock absorber 100 is adjustable in both up and down vertical directions and may adjust spring rate without ride height adjustment. Furthermore, the gas spring/shock absorber 100 may provide an anti-sway function to remove body roll when turning by adjusting the ride height of the front and rear inside turning wheels of the vehicle as described later in respect of the embodiment of FIG. 4, the gas spring may be over-driven to give instantaneous plush or softer spring rate suspension to one wheel when, for example, encountering an obstacle such as a log or boulder.

Again, reference herein to up/down, top/bottom, upper/lower is not intended to be limiting as other orientations will also work, for example if the orientation is altered by 90 or 180 degrees so that up/down becomes side-to-side or down/up respectively.

Figure 3:
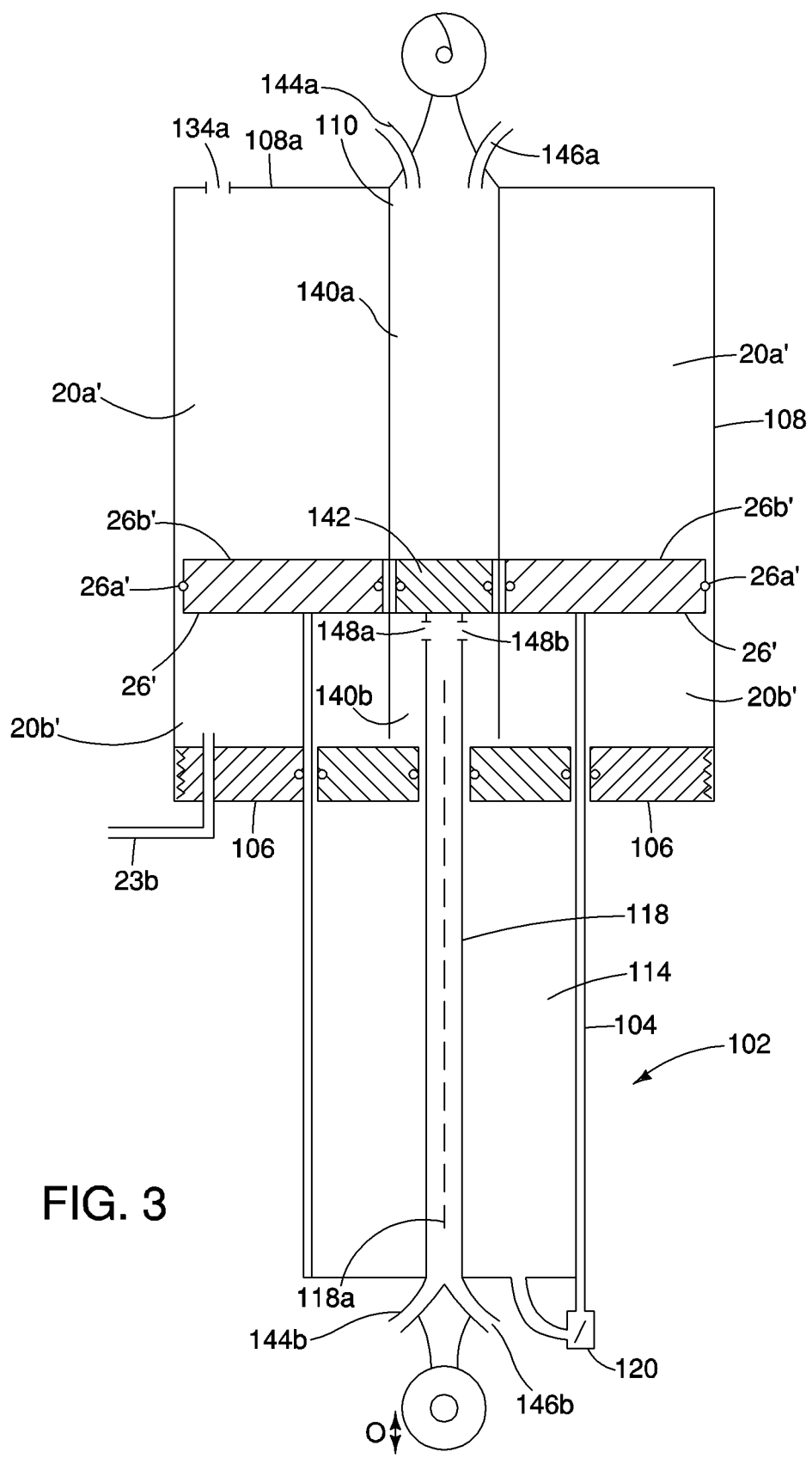
FIG. 3 depicts a cross-sectional view of the combined gas spring/shock absorber with a built-in compressor function in accordance with an embodiment of the present invention.

In some embodiments of the present disclosure, the combined gas spring/shock absorber 100 includes a built in compressor function, as shown in FIG. 3, so as to further assist with ride comfort, handling, and vehicle control, functioning analogous to a strut, and so as to provide a more self-contained unit. In this embodiment of the present disclosure, the shock absorber shaft 110 is divided into an upper chamber 140a and lower chamber 140b whereby the upper chamber 140a and lower chamber 140b are separated by a piston 142. An inlet valve 144a and outlet valve 146a are provided for the upper chamber 140a whereby air enters the chamber 140a through the inlet valve 144a and compressed air flows out from the chamber 140a through the outlet valve 146a. In addition, an inlet valve 144b and outlet valve 146b are provided for the bypass line 118, which extends along the shaft 110, through lower chamber 140b. Air flows from the inlet valve 144b, through the bypass line 118, to the lower chamber 140b via apertures 148a, 148b in the bypass line 118. Compressed air may flow from the lower chamber 140b to the outlet valve 146b via apertures 148a, 148b in the bypass line 118. The outlet valves 146a, 146b are connected to storage tanks, for storage of the compressed air, or to other chambers (eg. other cylinders), or to atmosphere. Storage tanks are not illustrated in the Figures for sake of clarity.

Each of the upper and lower chambers 140a, 140b, is provided with a pressure sensor (not shown) for monitoring the pressure of each chamber and controlling the flow of air into the upper and lower chambers 140a, 140b of the shock absorber shaft 110 through the inlet valves 144a, 144b, and the flow of compressed air out of the chambers 140a, 140b through the outlet valves 146a, 146b. The pressure sensors 29 are in electronic communication with electronic controller 16; however, wires between the pressure sensors 29 and the electronic controller 16 are not illustrated in the Figures for the sake of clarity. In other embodiments of the present disclosure, the electronic communication between the electronic controller 16 and the pressure sensors 29 may also be accomplished wirelessly.

Figure 4:
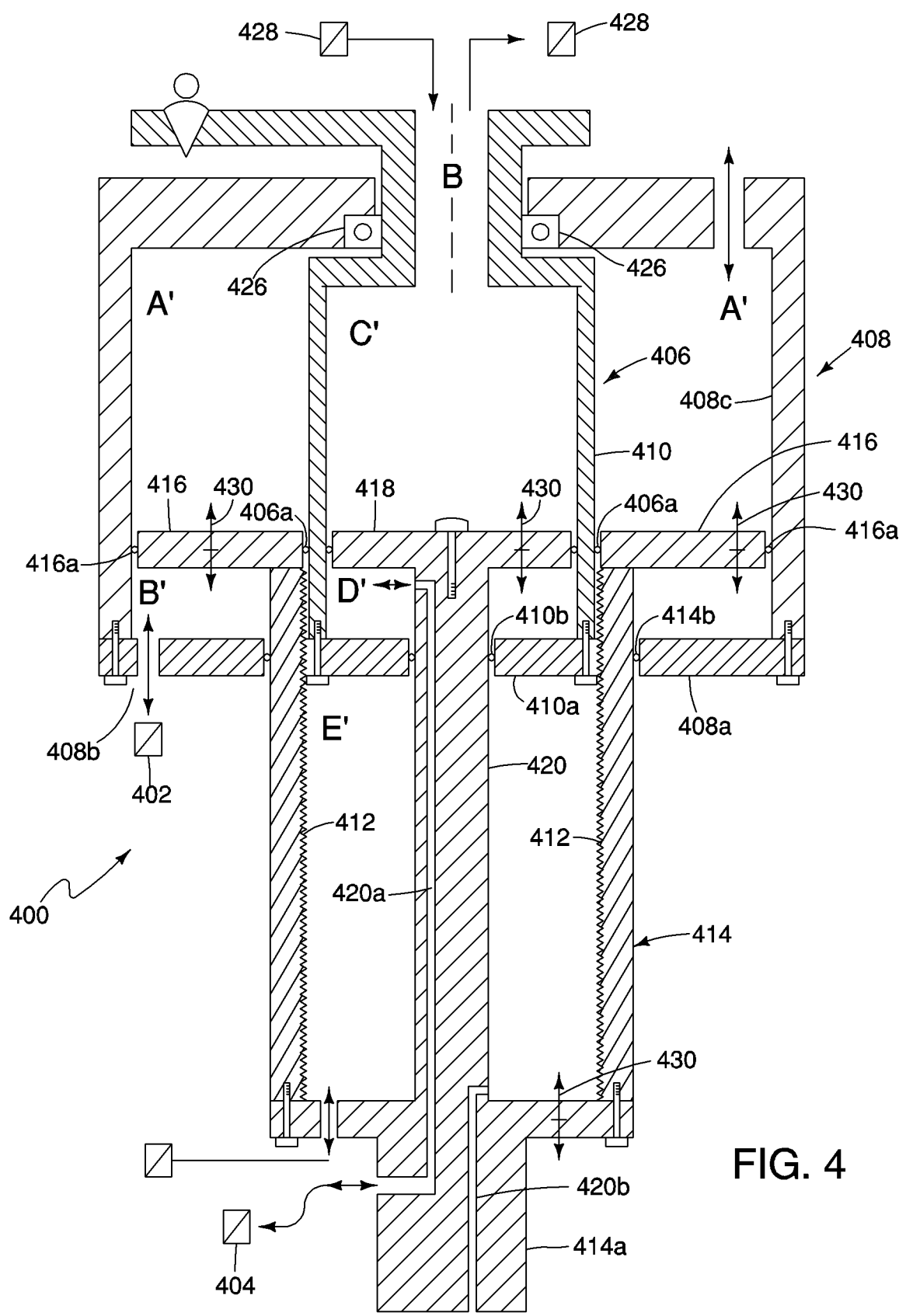
FIG. 4 depicts a cross-sectional view of the combined gas spring/shock absorber in a single housing operation accordance with an embodiment of the present invention.

In the embodiment of FIG. 4, a combined gas spring and shock absorber 400, in a single housing operation, provides controllable, low pressure, all-in-one suspension for vehicles including wheeled vehicles, tracked vehicles including snowmobiles, etc.

Characteristics of a combined gas spring/shock absorber 400 may include low pressure compression in the gas spring making it adjustable during use, a low pressure built-in shock absorber using gas or fluid. The gas option for the gas spring uses no oil, and when the gas is air uses atmospheric air for control and cooling, and provides complete compression and rebound control. Gas spring/shock absorber 400 has multiple chambers, allowing it to have multiple compressor options, reverse itself, over or under drive itself by augmenting pressures or counteracting them, influence or transfer pressure to other springs in the vehicle system. The system provides for substantially completely, exponentially tuning spring rate, travel, sway, pitch, roll, angles, speed, and comfort in both the shock absorber and gas, and may be used as a strut or steering strut. Gas spring/shock absorber 400 is advantageously light, compact, and completely self-contained, providing shock, sway bar, spring, height, cornering and tilt control. It is versatile, scaleable and simple.

As seen in the cross-sectional view of FIG. 4, chamber A' supports the vehicle weight and provides the spring rate. Chambers B' and D' provide the reverse spring force, for example to raise the corresponding wheel or track or to change the spring rate. Chambers B' and D' also may help dampen oscillations; that is, act as a shock absorber, by releasing air to the atmosphere, or drawing air in from the atmosphere through valves 402 and 404 respectively each time the gas spring (A,' C' over B', D') compresses or rebounds. The air flow velocity through the valves 404 may be further controlled by means known to one skilled in the art so as to externally manipulate the shock absorber portion (C' over D') enabling the absorber shock (C' over D') to be customized or tuned for different vehicles and applications. As before, the released air may also be diverted to a tank (not shown) as compressed air.

Chambers C' and E' would automatically compress air as the gas spring is compressed and draw air in as the air spring is extended. This air can also be released to atmosphere through similar one-way flow control valves, thereby providing more or different spring dampening. Chambers C' and E' could thus also be used as compressors.

Chambers C' and E' could work in tandem with chambers B' and D'. Instead of chambers C' and E' releasing air under compression to atmosphere, some air could be momentarily diverted to B' and D'. Pressurizing chambers B' and D' would cause the air spring to resist rebounding, before the pressurized air from chambers B' and D' is released to atmosphere, thereby increasing oscillation control of the shock absorber action.

In extreme off-road conditions chambers C' and E' may be used to provide pressure to chambers B' and D' to augment or increase the compression travel, before the air is released to atmosphere. For example if the right front tire of the vehicle is climbing a very large rock, pressurizing chambers B', D' would force the spring chamber A' to compress further than normal, thereby keeping the right corner of the vehicle from being pushed up by the rock. This would keep the vehicle more level and prevent the opposite tire (in this case, the left front tire) from being lifted off the ground. This would then reduce the rock impact from being transferred to the vehicle occupants. It would also keep the vehicle body more level while allowing the suspension to further articulate and would help keep the tires more in contact with the ground for better traction, in other words acting like a softer spring. Thus over-driving the gas spring gives the corresponding wheel's suspension a plush or instantaneously softer spring rate.

The same would happen on vehicle front end droop, e.g. where the tire encounters a big hole, when chambers B' and D' are used to pressurize chambers C' and E'. The tire would be forced down into the hole rather than just left hanging up in the air like on a conventional suspension. This will assist in maintaining better ground contact, traction, stabilizing the suspension, keep vehicle more level, minimize the tipping characteristics of the vehicle when one tire is hanging.

Chambers C' and E', and B' and D' could also be closed completely by a steering sensor (not shown) which detects vehicle cornering, and then causes the air spring to stiffen, thereby minimizing vehicle body roll in corners or during avoidance maneuvers. All of these functions are provided in the spring of FIG. 4 by controlling the air flow between the chambers either mechanically or with a computerized system.

The option also exists to transfer air to other cylinders thereby greatly improving/changing the possibilities of the system. Moving air to other cylinders, for example located in other corners of the vehicle, allows influence over every aspect of a vehicles handling.

This system could counter-act the effects of gravity on vehicle steering and off-road performance, for example providing tilt to the vehicle in corners, and provide both a road racing suspension and an off-road racing suspension. By continually drawing in and expelling external air the combination air spring/shock absorber of FIG. 4 should prevent heat build up and even cool the air spring. This system may be cheaper, lighter, more compact, more tunable than is conventionally known, and may increase vehicle performance, save fuel, and improve handling.

One implementation of the embodiment of FIG. 4 is adapted for use as suspension for a snowmobile.

The shock absorber 406 (chambers C' over D') is resilient along the centroidal axis B relative to the gas spring 408 (chambers A', C' over B', D') upon a force acting in direction C on the lower end of the combination gas spring and shock absorber 400.

Shock absorber 406 includes piston 418 sliding along axis B within cylinder 410. Cylinder 410 is itself slidably journaled along splines 412, parallel to axis B, and annular seals 406a in the base cylinder 414 of gas spring 408. The upper end of base cylinder 414 is mounted to a piston 416. Piston 416 extends around cylinder 410 and floats slidably along the interior surface of the cylindrical housing wall 408e of gas spring 408 so as to translate in direction D. Annular seal 416a on piston 416 seals against the housing wall 408c of gas spring 408.

Within shock absorber 406, piston 418 is mounted on shaft 420. Piston 418 separates chambers C' and D'. Shaft 420 extends along axis B through Chamber D' and slidably through an aperture in base 410a of cylinder 410, sealed by annular seal 410b. Collar 424 may be rotatably mounted in bearings 426, and is mounted to the upper end of the cylinder 410 so as to extend along axis B. Gas spring 408 may be mounted to the frame of the vehicle as shown by way of example in FIG. 5.

Collar 424 provides a gas conduit for gas entering or leaving chamber C'. The flow of gas entering or leaving chamber C' is regulated by valves 428.

Gas entering or leaving annular chamber A', which extends around cylinder 410, is regulated via gas port 408a. Gas port 408a is used to increase or decrease gas pressure in chamber A', and is connected to a gas, such as air, pump or the like (not shown).

Gas entering or leaving annular chamber B' is regulated via gas port 408b and valve 402. Gas entering or leaving annular chamber D' is regulated via gas duct 420a in shaft 420 and valve 404. Gas entering or leaving annular chamber E' is regulated via duct 420b. Ducts 420a and 420b extend through and along shaft 420 and through the lower end 414a of cylindrical base 414.

Small apertures 430, which may for example be threaded so as to accept correspondingly threaded flow adjustment screws (not show), may be provided in pistons 416, 418 and in lower end 414a of base cylinder 414.

Thus it may be seen that pistons 416, 418, mounted on the upper end of, respectively, base cylinder 414 and shaft 420, move in unison within the housing of gas spring 408 and shock absorber cylinder 410, respectively, as both base cylinder 414 and shaft 420 are mounted on lower end 414a. Base cylinder 414 translates along axis B, sliding over seal 414b mounted in the perimeter of the aperture in annular floor 408d.

In the example of FIG. 4, air leaving chamber C' may be used to add pressure to chamber D'. Valve 428 may also release air to atmosphere, for example during slowing of the vehicle, to assist in stabilizing the vehicle during cornering in the case of for example a four-wheeled vehicle.

Applying suction (negative pressure) by withdrawing air from chambers A', C' while pressurizing chambers B', D' acts to adjust ride height, and for example in a four wheeled vehicle may be used to actively raise one wheel to assist in crossing obstacles.

Figure 5:
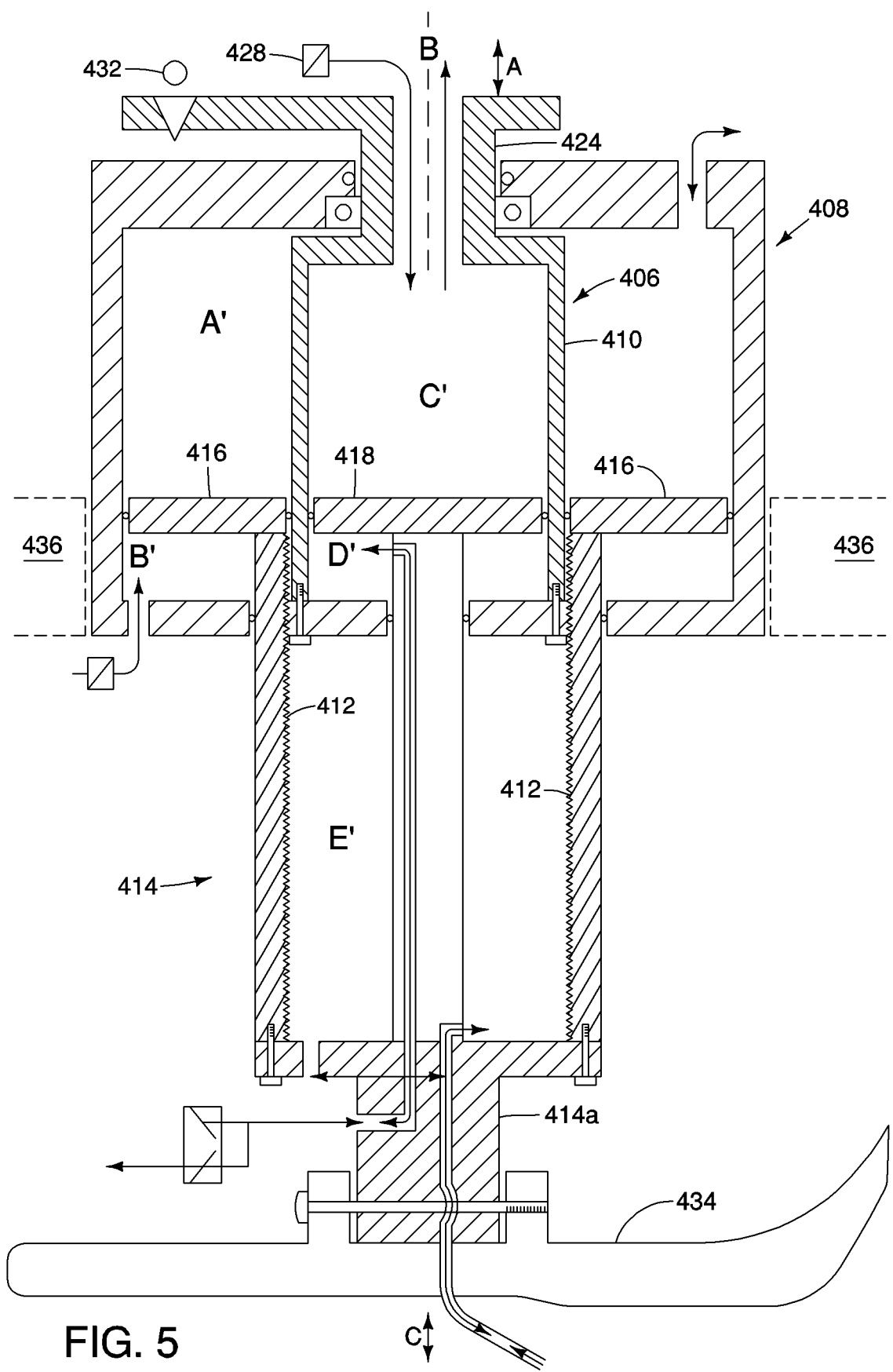
FIG. 5 depicts cross-sectional view of the embodiment of FIG. 4 adapted to be mounted on the frame of a vehicle in accordance with an embodiment of the present invention.

In FIG. 5, wherein the embodiment of FIG. 4 is shown adapted for use on a snowmobile, steering inputs are through the rod 432 coupled to collar 424. Ski 434 is mounted under lower end 414a of base cylinder 414. Impacts to ski 434 during travel of the snowmobile are thus taken up by shock absorber 406 (whether or not acting to dampen or acting as a compressor, or both) and the gas spring 408. Force from the impact to the ski which is not dampened or absorbed is passed to the snowmobile frame 436 which is clamped or otherwise mounted onto gas spring 408. Splines 412 in base cylinder 414, which now acts as a splined steering sleeve, provide for telescoping of the shock absorber cylinder 410 in the steering sleeve. Thus, the snowmobile may be steered during receiving, dampening and absorbing shocks or impacts to the ski during travel.

The use of the valves allows locking-up and unlocking at least the gas spring upon steering inputs in real time to replace the use of a sway bar.

What is claimed:

1. A combination gas spring and shock absorber apparatus comprising:
    a vented gas spring housing comprising at least one port for venting,
    a vented shock absorber housing slidably mounted within the gas spring housing,
    a shock absorber piston concentrically mounted within a gas spring piston,
    a base housing slidably mounted in the gas spring housing so as to extend a distal end of the base housing into the gas spring housing, a shaft extending through the base housing and, into the shock absorber housing the shaft having a free end slidably extending from the base housing into the shock absorber housing, the shaft comprising a bypass line with a bypass valve for venting the shock absorber housing,
    the shock absorber piston mounted in the shock absorber housing on the free end of the shaft,
    the gas spring piston mounted in the gas spring housing on the distal end of the base housing,
    wherein the shock absorber piston is fluidically sealed within and against, for sealed sliding translation in and along, the shock absorber housing,
    and wherein the gas spring piston is fluidically sealed within and against the gas spring housing on an outer perimeter of the gas spring piston and is fluidically sealed against the shock absorber housing, for sealed sliding translation in and along the gas spring housing and along the shock absorber housing respectively,
    and wherein the base housing is fluidically sealed for sealed telescopic translation of the base housing relative to the gas spring housing.

2. The apparatus of claim 1 wherein the gas spring housing and the shock absorber housing are cylindrical and having a common centroidal axis, and wherein the translation of the shock absorber housing and base housing is along the common centroidal axis.

3. The apparatus of claim 2 wherein the shaft lies along the centroidal axis.

* * * * *